United States Patent
Hammad (10) Patent No.: US 8,972,303 B2
(45) Date of Patent: Mar. 3, 2015

(54) TRACK DATA ENCRYPTION

(75) Inventor: Ayman Hammad, Pleasanton, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

(21) Appl. No.: 12/883,413

(22) Filed: Sep. 16, 2010

(65) Prior Publication Data

US 2011/0004553 A1    Jan. 6, 2011

Related U.S. Application Data

(63) Continuation of application No. 11/761,821, filed on Jun. 12, 2007, now Pat. No. 7,818,264.

(60) Provisional application No. 60/884,089, filed on Jan. 9, 2007, provisional application No. 60/815,430, filed on Jun. 20, 2006, provisional application No. 60/815,059, filed on Jun. 19, 2006.

(51) Int. Cl.
*G06Q 20/00* (2012.01)
*G06Q 20/38* (2012.01)
(Continued)

(52) U.S. Cl.
CPC .......... *G06Q 20/3829* (2013.01); *G06Q 20/085* (2013.01); *G06Q 20/20* (2013.01); *G06Q 20/367* (2013.01); *G06Q 20/3672* (2013.01); *G06Q 20/3674* (2013.01); *G06Q 20/382* (2013.01); *G06Q 20/3821* (2013.01); *G06Q 20/385* (2013.01); *G06Q 20/40* (2013.01); *G06Q 20/401* (2013.01); *G06Q 30/06* (2013.01); *G06Q 40/00* (2013.01); *H04L 9/3271* (2013.01);
(Continued)

(58) Field of Classification Search
CPC ....... G06Q 20/10; G06Q 40/02; G06Q 20/40; G06Q 40/00; G06Q 20/04; G06Q 20/105; G06Q 20/24; G06Q 20/22; H04L 12/2856; H04L 12/43
USPC ...................................... 705/50–79
See application file for complete search history.

(56) References Cited

U.S. PATENT DOCUMENTS 3,956,615 A    5/1976  Anderson et al.
4,186,871 A    2/1980  Anderson et al.
(Continued)

FOREIGN PATENT DOCUMENTS

JP    2000322486 A    11/2000
JP    2002024719 A    1/2002
(Continued)

OTHER PUBLICATIONS

Fujitsu Microelectronics America Announces New Fingerprint Identification Technology for Cell Phones, Mobile Devices Mar. 11, 2002 by Fujitsu Microelectronics America, Inc at www.fujitsu.com/us/news/pr/fma_20020311.html.
(Continued)

*Primary Examiner* — Calvin L Hewitt, II
*Assistant Examiner* — Mohammad A Nilforoush
(74) *Attorney, Agent, or Firm* — Kilpatrick Townsend & Stockton LLP (57) ABSTRACT

A method for using a secondary PAN is disclosed. The method includes providing a secondary PAN associated with a primary PAN, where the secondary PAN has at least one end portion that is the same as the primary PAN, but has a middle portion of that is different than the primary PAN.

20 Claims, 6 Drawing Sheets (51) Int. Cl.
  *G06Q 20/08* (2012.01)
  *G06Q 20/20* (2012.01)
  *G06Q 20/36* (2012.01)
  *G06Q 20/40* (2012.01)
  *G06Q 30/06* (2012.01)
  *G06Q 40/00* (2012.01)
  *H04L 9/32* (2006.01)
  *G06Q 20/10* (2012.01)

(52) U.S. Cl.
  CPC .......... *G06Q2220/00* (2013.01); *G06Q 20/105* (2013.01); *G06Q 20/204* (2013.01); *H04L 2209/56* (2013.01)
  USPC ................................. 705/67; 705/64; 705/74

(56) References Cited

U.S. PATENT DOCUMENTS

| | | | |
|---|---|---|---|
| 4,238,853 A | 12/1980 | Ehrsam et al. |
| 4,277,837 A | 7/1981 | Stuckert |
| 4,317,957 A | 3/1982 | Sendrow |
| 4,423,287 A | 12/1983 | Zeidler |
| 4,528,442 A | 7/1985 | Endo |
| 4,614,861 A | 9/1986 | Pavlov |
| 4,707,592 A | 11/1987 | Ware |
| 4,742,351 A | 5/1988 | Suzuki |
| 4,852,165 A | 7/1989 | Copella et al. |
| 5,254,843 A | 10/1993 | Hynes et al. |
| 5,311,594 A | 5/1994 | Penzias |
| 5,361,062 A | 11/1994 | Weiss et al. |
| 5,420,926 A | 5/1995 | Low et al. |
| 5,434,398 A | 7/1995 | Goldberg |
| 5,465,387 A | 11/1995 | Mukherjee |
| 5,513,250 A | 4/1996 | McAllister |
| 5,530,438 A | 6/1996 | Bickham et al. |
| 5,539,810 A | 7/1996 | Kennedy et al. |
| 5,613,012 A | 3/1997 | Hoffman et al. |
| 5,615,110 A | 3/1997 | Wong |
| 5,625,689 A | 4/1997 | Indeck et al. |
| 5,627,355 A | 5/1997 | Rahman et al. |
| 5,679,940 A | 10/1997 | Templeton et al. |
| 5,708,422 A | 1/1998 | Blonder et al. |
| 5,715,399 A | 2/1998 | Bezos et al. |
| 5,721,781 A | 2/1998 | Deo et al. |
| 5,740,244 A | 4/1998 | Indeck et al. |
| 5,745,576 A | 4/1998 | Abraham et al. |
| 5,774,525 A | 6/1998 | Kanevsky et al. |
| 5,819,226 A | 10/1998 | Gopinathan et al. |
| 5,832,458 A | 11/1998 | Jones |
| 5,834,747 A | 11/1998 | Cooper |
| 5,835,599 A | 11/1998 | Buer |
| 5,839,119 A | 11/1998 | Krsul et al. |
| 5,872,834 A | 2/1999 | Teitelbaum |
| 5,878,337 A | 3/1999 | Joao et al. |
| 5,883,810 A | 3/1999 | Franklin et al. |
| 5,903,830 A | 5/1999 | Joao et al. |
| 5,914,471 A | 6/1999 | Van De Pavert |
| 5,914,472 A | 6/1999 | Foladare et al. |
| 5,920,628 A | 7/1999 | Indeck et al. |
| 5,956,699 A | 9/1999 | Wong et al. |
| 5,988,497 A | 11/1999 | Wallace |
| 6,000,832 A | 12/1999 | Franklin et al. |
| 6,005,942 A | 12/1999 | Chan et al. |
| 6,012,144 A | 1/2000 | Pickett |
| 6,016,476 A | 1/2000 | Maes et al. |
| 6,029,154 A | 2/2000 | Pettitt |
| 6,055,505 A | 4/2000 | Elston |
| 6,064,990 A | 5/2000 | Goldsmith |
| 6,065,679 A | 5/2000 | Levie et al. |
| 6,081,792 A | 6/2000 | Cucinotta et al. |
| 6,095,413 A | 8/2000 | Tetro et al. |
| 6,112,191 A | 8/2000 | Burke |
| 6,122,624 A | 9/2000 | Tetro et al. |
| 6,157,707 A | 12/2000 | Baulier et al. |
| 6,163,771 A | 12/2000 | Walker et al. |
| 6,219,793 B1 | 4/2001 | Li et al. |
| 6,236,981 B1 | 5/2001 | Hill |
| 6,260,146 B1 | 7/2001 | Mos et al. |
| 6,263,447 B1 | 7/2001 | French et al. |
| 6,267,292 B1 | 7/2001 | Walker et al. |
| 6,282,656 B1 | 8/2001 | Wang |
| 6,298,336 B1 | 10/2001 | Davis et al. |
| 6,308,890 B1 | 10/2001 | Cooper |
| 6,327,578 B1 | 12/2001 | Linehan |
| 6,330,550 B1 | 12/2001 | Brisebois et al. |
| 6,367,011 B1 | 4/2002 | Lee et al. |
| 6,415,386 B1 | 7/2002 | Shi |
| 6,442,532 B1 | 8/2002 | Kawan |
| 6,488,206 B1 | 12/2002 | Flaig et al. |
| 6,496,936 B1 | 12/2002 | French et al. |
| 6,505,046 B1 | 1/2003 | Baker |
| 6,523,745 B1 | 2/2003 | Tamori |
| 6,529,725 B1 | 3/2003 | Joao et al. |
| 6,535,855 B1 | 3/2003 | Cahill et al. |
| 6,592,044 B1 | 7/2003 | Wong et al. |
| 6,607,136 B1 | 8/2003 | Atsmon et al. |
| 6,612,488 B2 | 9/2003 | Suzuki |
| 6,631,482 B1 | 10/2003 | Marks |
| 6,636,833 B1 | 10/2003 | Flitcroft et al. |
| 6,647,269 B2 | 11/2003 | Hendrey et al. |
| 6,714,918 B2 | 3/2004 | Hillmer et al. |
| 6,715,672 B1 | 4/2004 | Tetro et al. |
| 6,748,367 B1 | 6/2004 | Lee |
| RE38,572 E | 8/2004 | Tetro et al. |
| 6,775,539 B2 | 8/2004 | Deshpande |
| 6,830,183 B2 | 12/2004 | von Mueller et al. |
| 6,832,721 B2 | 12/2004 | Fujii |
| 6,836,670 B2 | 12/2004 | Casstrogiovanni et al. |
| 6,837,425 B2 | 1/2005 | Gauthier et al. |
| 6,839,692 B2 | 1/2005 | Carrott et al. |
| 6,839,840 B1 | 1/2005 | Cooreman |
| 6,839,845 B2 | 1/2005 | Hsu et al. |
| 6,857,073 B2 | 2/2005 | French et al. |
| 6,862,575 B1 | 3/2005 | Anttila et al. |
| 6,868,391 B1 | 3/2005 | Hultgren |
| 6,877,661 B2 | 4/2005 | Webb et al. |
| 6,879,965 B2 | 4/2005 | Fung et al. |
| 6,899,269 B1 | 5/2005 | Deland |
| 6,913,194 B2 | 7/2005 | Suzuki |
| 6,931,382 B2 | 8/2005 | Laage et al. |
| 6,941,285 B2 | 9/2005 | Sarcanin |
| 6,944,782 B2 | 9/2005 | von Mueller et al. |
| 6,948,656 B2 | 9/2005 | Williams |
| 6,968,180 B2 | 11/2005 | Kirby et al. |
| 6,983,882 B2 | 1/2006 | Cassone |
| 7,003,495 B1 | 2/2006 | Burger et al. |
| 7,003,497 B2 | 2/2006 | Maes |
| 7,007,025 B1 | 2/2006 | Nason |
| 7,007,840 B2 | 3/2006 | Davis |
| 7,013,293 B1 | 3/2006 | Kipnis et al. |
| 7,024,396 B2 | 4/2006 | Woodward |
| 7,044,394 B2 | 5/2006 | Brown |
| 7,051,002 B2 | 5/2006 | Keresman, III et al. |
| 7,058,611 B2 | 6/2006 | Kranzley et al. |
| 7,058,978 B2 | 6/2006 | Feuerstein et al. |
| 7,080,035 B1* | 7/2006 | Williams et al. ................ 705/40 |
| 7,096,003 B2 | 8/2006 | Joao et al. |
| 7,107,250 B2 | 9/2006 | Harrison |
| 7,143,095 B2 | 11/2006 | Barrett et al. |
| 7,152,788 B2 | 12/2006 | Williams |
| 7,155,411 B1 | 12/2006 | Blinn et al. |
| 7,177,848 B2 | 2/2007 | Hogan et al. |
| 7,225,156 B2 | 5/2007 | Fisher et al. |
| 7,243,853 B1 | 7/2007 | Levy et al. |
| 7,251,624 B1 | 7/2007 | Lee et al. |
| 7,257,545 B1 | 8/2007 | Hung |
| 7,264,154 B2 | 9/2007 | Harris |
| 7,287,692 B1 | 10/2007 | Patel et al. |
| 7,292,999 B2 | 11/2007 | Hobson et al. |
| 7,343,317 B2 | 3/2008 | Jokinen et al. |
| 7,349,668 B2 | 3/2008 | Ilan et al. |
| 7,350,230 B2 | 3/2008 | Forrest |
| 7,353,382 B2 | 4/2008 | Labrou et al. |
| D568,388 S | 5/2008 | Hammad |

(56) References Cited

U.S. PATENT DOCUMENTS

| | | |
|---|---|---|
| D568,389 S | 5/2008 | Hammad |
| D568,390 S | 5/2008 | Law et al. |
| 7,376,629 B1 | 5/2008 | McIsaac et al. |
| 7,403,908 B1 | 7/2008 | Jaramillo |
| 7,415,109 B2 | 8/2008 | Rose |
| 7,420,474 B1 | 9/2008 | Elks et al. |
| 7,444,676 B1 | 10/2008 | Asghari-Kamrani et al. |
| 7,506,812 B2 | 3/2009 | von Mueller et al. |
| 7,527,208 B2 | 5/2009 | Hammad |
| 7,548,889 B2 | 6/2009 | Bhambri et al. |
| 7,571,139 B1 | 8/2009 | Giordano et al. |
| 7,580,898 B2 | 8/2009 | Brown et al. |
| 7,584,153 B2 | 9/2009 | Brown et al. |
| 7,650,314 B1 | 1/2010 | Saunders |
| 7,665,657 B2 | 2/2010 | Huh |
| 7,685,037 B2 | 3/2010 | Reiners et al. |
| 7,707,120 B2 | 4/2010 | Dominguez et al. |
| 7,712,655 B2 | 5/2010 | Wong |
| 7,731,086 B2 | 6/2010 | Saunders et al. |
| 7,734,527 B2 | 6/2010 | Uzo |
| 7,740,168 B2 | 6/2010 | Hammad |
| 7,740,173 B2 | 6/2010 | Von Mueller et al. |
| 7,761,374 B2 | 7/2010 | Sahota |
| 7,793,851 B2 | 9/2010 | Mullen |
| 7,810,165 B2 | 10/2010 | Hammad |
| 7,818,264 B2 | 10/2010 | Hammad |
| 7,853,995 B2 | 12/2010 | Chow et al. |
| 7,877,299 B2 | 1/2011 | Bui |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,925,908 B2 | 4/2011 | Kim |
| 7,938,726 B2 | 5/2011 | Brunet de Courssou |
| 7,959,076 B1 | 6/2011 | Hopkins, III |
| 8,025,223 B2 | 9/2011 | Saunders et al. |
| 8,060,448 B2 | 11/2011 | Jones |
| 8,082,210 B2 | 12/2011 | Hansen et al. |
| 8,104,679 B2 | 1/2012 | Brown |
| 8,118,223 B2 | 2/2012 | Hammad |
| 8,135,647 B2 | 3/2012 | Hammad |
| 8,205,791 B2 | 6/2012 | Randazza et al. |
| 8,249,993 B2 | 8/2012 | von Mueller |
| 8,412,837 B1 | 4/2013 | Emigh et al. |
| 8,417,642 B2 | 4/2013 | Oren |
| 8,453,925 B2 | 6/2013 | Fisher et al. |
| 8,584,251 B2 | 11/2013 | McGuire et al. |
| 8,595,490 B2 | 11/2013 | von Mueller et al. |
| 2001/0047334 A1 | 11/2001 | Nappe |
| 2001/0056409 A1 | 12/2001 | Bellovin et al. |
| 2002/0007320 A1 | 1/2002 | Hogan et al. |
| 2002/0016749 A1 | 2/2002 | Borecki et al. |
| 2002/0026478 A1 | 2/2002 | Rodgers et al. |
| 2002/0069240 A1 | 6/2002 | Berk |
| 2002/0073044 A1 | 6/2002 | Singhal |
| 2002/0073045 A1 | 6/2002 | Rubin et al. |
| 2002/0073315 A1 | 6/2002 | Candelore |
| 2002/0077144 A1 | 6/2002 | Keller |
| 2002/0091562 A1 | 7/2002 | Siegel et al. |
| 2002/0091945 A1 | 7/2002 | Ross |
| 2002/0095389 A1 | 7/2002 | Gaines |
| 2002/0099665 A1 | 7/2002 | Burger et al. |
| 2002/0107798 A1 | 8/2002 | Hameau |
| 2002/0108062 A1 | 8/2002 | Nakajima et al. |
| 2002/0133462 A1 | 9/2002 | Shteyn |
| 2002/0153424 A1 | 10/2002 | Li et al. |
| 2002/0194499 A1 | 12/2002 | Audebert et al. |
| 2003/0028481 A1 | 2/2003 | Flitcroft |
| 2003/0074317 A1 | 4/2003 | Hofi |
| 2003/0080185 A1 | 5/2003 | Werther |
| 2003/0115142 A1 | 6/2003 | Brickell et al. |
| 2003/0126094 A1 | 7/2003 | Fisher |
| 2003/0130955 A1 | 7/2003 | Hawthorne |
| 2003/0135463 A1 | 7/2003 | Brown et al. |
| 2003/0140007 A1 | 7/2003 | Kramer et al. |
| 2003/0168510 A1 | 9/2003 | Allen |
| 2003/0169881 A1 | 9/2003 | Niedermeyer |
| 2003/0191945 A1 | 10/2003 | Keech |
| 2003/0200184 A1 | 10/2003 | Dominguez et al. |
| 2003/0208684 A1 | 11/2003 | Camacho et al. |
| 2003/0225703 A1 | 12/2003 | Angel |
| 2004/0024638 A1 | 2/2004 | Restis |
| 2004/0031856 A1 | 2/2004 | Atsmon et al. |
| 2004/0059688 A1 | 3/2004 | Dominguez et al. |
| 2004/0064403 A1 | 4/2004 | Hasumi et al. |
| 2004/0078340 A1 | 4/2004 | Evans |
| 2004/0107170 A1 | 6/2004 | Labrou et al. |
| 2004/0139008 A1 | 7/2004 | Mascavage, III |
| 2004/0156537 A1 | 8/2004 | Chung et al. |
| 2004/0171406 A1 | 9/2004 | Purk |
| 2004/0185830 A1 | 9/2004 | Joao et al. |
| 2004/0199470 A1 | 10/2004 | Ferry et al. |
| 2004/0260646 A1 | 12/2004 | Berardi et al. |
| 2005/0029349 A1 | 2/2005 | McGregor et al. |
| 2005/0037735 A1 | 2/2005 | Coutts |
| 2005/0060233 A1 | 3/2005 | Bonalle et al. |
| 2005/0060730 A1 | 3/2005 | Soeda et al. |
| 2005/0071226 A1 | 3/2005 | Nguyen et al. |
| 2005/0071227 A1 | 3/2005 | Hammad et al. |
| 2005/0071228 A1 | 3/2005 | Bortolin et al. |
| 2005/0071235 A1 | 3/2005 | Nguyen et al. |
| 2005/0080730 A1 | 4/2005 | Sorrentino |
| 2005/0091152 A1 | 4/2005 | Suisa |
| 2005/0097320 A1 | 5/2005 | Golan et al. |
| 2005/0122209 A1 | 6/2005 | Black |
| 2005/0125686 A1 | 6/2005 | Brandt |
| 2005/0149455 A1 | 7/2005 | Bruesewitz et al. |
| 2005/0170814 A1 | 8/2005 | Joao et al. |
| 2005/0171905 A1 | 8/2005 | Wankmueller et al. |
| 2005/0218229 A1 | 10/2005 | Morley et al. |
| 2005/0228986 A1 | 10/2005 | Fukasawa et al. |
| 2005/0246293 A1 | 11/2005 | Ong |
| 2005/0268107 A1 | 12/2005 | Harris et al. |
| 2005/0273442 A1 | 12/2005 | Bennett et al. |
| 2006/0018523 A1 | 1/2006 | Saitoh et al. |
| 2006/0059110 A1 | 3/2006 | Madhok et al. |
| 2006/0124756 A1 | 6/2006 | Brown |
| 2006/0136546 A1 | 6/2006 | Trioano et al. |
| 2006/0165060 A1 | 7/2006 | Dua |
| 2006/0189367 A1 | 8/2006 | Nguyen |
| 2006/0202025 A1 | 9/2006 | Calabrese et al. |
| 2006/0210071 A1 | 9/2006 | Chandran |
| 2006/0219776 A1 | 10/2006 | Finn |
| 2006/0235795 A1 | 10/2006 | Johnson et al. |
| 2006/0237528 A1 | 10/2006 | Bishop et al. |
| 2006/0253687 A1 | 11/2006 | Jakubowski |
| 2006/0265446 A1 | 11/2006 | Elgressy |
| 2006/0278704 A1 | 12/2006 | Saunders et al. |
| 2006/0281439 A1 | 12/2006 | Benco et al. |
| 2006/0282382 A1 | 12/2006 | Balasubramanian et al. |
| 2006/0290501 A1 | 12/2006 | Hammad et al. |
| 2006/0293027 A1 | 12/2006 | Hammad et al. |
| 2007/0017970 A1 | 1/2007 | Gauthier et al. |
| 2007/0034679 A1 | 2/2007 | Gauthier et al. |
| 2007/0055630 A1 | 3/2007 | Gauthier et al. |
| 2007/0057034 A1 | 3/2007 | Gauthier et al. |
| 2007/0130062 A1 | 6/2007 | Huh |
| 2007/0136131 A1 | 6/2007 | Mankoff |
| 2007/0245414 A1 | 10/2007 | Chan et al. |
| 2007/0250380 A1 | 10/2007 | Mankoff |
| 2007/0260544 A1 | 11/2007 | Wankmueller et al. |
| 2007/0288641 A1 | 12/2007 | Lee et al. |
| 2007/0294182 A1 | 12/2007 | Hammad |
| 2008/0004121 A1 | 1/2008 | Gatto |
| 2008/0005037 A1 | 1/2008 | Hammad et al. |
| 2008/0029593 A1 | 2/2008 | Hammad et al. |
| 2008/0034221 A1 | 2/2008 | Hammad et al. |
| 2008/0040271 A1 | 2/2008 | Hammad et al. |
| 2008/0040276 A1 | 2/2008 | Hammad et al. |
| 2008/0052782 A1 | 2/2008 | Hillis |
| 2008/0065553 A1 | 3/2008 | Faith et al. |
| 2008/0103982 A1 | 5/2008 | Hammad et al. |
| 2008/0116264 A1 | 5/2008 | Hammad |
| 2008/0120214 A1 | 5/2008 | Steele |
| 2008/0120236 A1 | 5/2008 | Faith et al. |

(56) References Cited

U.S. PATENT DOCUMENTS

| | | |
|---|---|---|
| 2008/0163257 A1 | 7/2008 | Carlson |
| 2008/0172737 A1 | 7/2008 | Shen |
| 2008/0183480 A1 | 7/2008 | Carlson et al. |
| 2008/0201212 A1 | 8/2008 | Hammad |
| 2008/0203151 A1 | 8/2008 | Dixon |
| 2008/0203152 A1 | 8/2008 | Hammad |
| 2008/0203170 A1 | 8/2008 | Hammad |
| 2008/0208681 A1 | 8/2008 | Hammad |
| 2008/0243702 A1 | 10/2008 | Hart et al. |
| 2008/0275829 A1 | 11/2008 | Stull |
| 2008/0303632 A1 | 12/2008 | Hammad |
| 2009/0006262 A1 | 1/2009 | Brown et al. |
| 2009/0083191 A1 | 3/2009 | Hammad |
| 2009/0089213 A1 | 4/2009 | Hammad |
| 2009/0106112 A1 | 4/2009 | Dalmia et al. |
| 2009/0171682 A1 | 7/2009 | Dixon |
| 2009/0171849 A1 | 7/2009 | Hammad |
| 2009/0202081 A1 | 8/2009 | Hammad |
| 2010/0027780 A1 | 2/2010 | Jung |
| 2011/0004553 A1 | 1/2011 | Hammad |
| 2013/0262296 A1 | 10/2013 | Thomas et al. |
| 2013/0297508 A1 | 11/2013 | Belamant |

FOREIGN PATENT DOCUMENTS

| | | |
|---|---|---|
| JP | 2002366868 A | 12/2002 |
| JP | 2003519420 A | 6/2003 |
| WO | 01/35304 A1 | 5/2001 |
| WO | WO 2005/059795 A1 | 6/2005 |

OTHER PUBLICATIONS

Extended European Search Report mailed on Jul. 10, 2011, for EP Patent Application No. 07798557.0, 6 pages.
European Communication mailed on Feb. 5, 2013 for EP Patent Application No. 08781002.4, 6 pages.
Australian Office Action mailed on Feb. 21, 2013 for AU Patent Application No. 2008268326, 3 pages.
Japanese Office Action mailed Oct. 12, 2012 in Application No. 2009-516638, issued Oct. 10, 2012.
Restriction Requirement for U.S. Appl. No. 11/761,821 mailed Oct. 3, 2008, 6 pages.
Non-Final Office Action for U.S. Appl. No. 11/761,821 mailed on Jan. 23, 2009, 14 pages.
Final Office Action for U.S. Appl. No. 11/761,821 mailed on Jul. 8, 2009, 15 pages.
Non-Final Office Action for U.S. Appl. No. 11/761,821 mailed on Jan. 21, 2010, 23 pages.
Non-Final Office Action for U.S. Appl. No. 12/263,933 mailed on Jun. 9, 2010, 20 pages.
Non-Final Office Action for U.S. Appl. No. 12/264,036 mailed on Aug. 3, 2010, 18 pages.
Final Office Action for U.S. Appl. No. 12/263,933 mailed on Nov. 26, 2010, 21 pages.
Final Office Action for U.S. Appl. No. 12/264,036 mailed on Feb. 1, 2011, 23 pages.
Non-Final Office Action for U.S. Appl. No. 12/263,982 mailed on Apr. 12, 2011, 13 pages.
Extended European Search Report mailed Oct. 7, 2011 in EP Patent Application No. 07798557.0 issued on Oct. 7, 2011, 6 pages.
Final Office Action for U.S. Appl. No. 12/263,982 mailed on Dec. 15, 2011, 14 pages.
Korean Notice of Non-Final Rejection mailed Jan. 8, 2014 in KR Patent Application No. 10-2009-7000832, 6 pages.
Non-Final Office Action for U.S. Appl. No. 12/264,036 mailed on Feb. 20, 2014, 11 pages.
Japanese office action mailed Jun. 7, 2013 for JP Patent Application No. 2009-516638, 8 pages.
U.S. Appl. No. 11/761,370, filed Jun. 14, 2007.
U.S. Appl. No. 11/763,240, filed Jun. 14, 2007.
U.S. Appl. No. 11/764,343, filed Jun. 18, 2007.
U.S. Appl. No. 11/764,351, filed Jun. 18, 2007.
U.S. Appl. No. 11/764,361, filed Jun. 18, 2007.
U.S. Appl. No. 11/764,376, filed Jun. 18, 2007.
U.S. Appl. No. 11/764,622, filed Jun. 18, 2007.
International Search Report mailed on Dec. 6, 2007, for PCT Patent Application No. PCT/US07/71200, 1 page.
Written Opinion of the International Searching Authority mailed on Dec. 6, 2007, for PCT Patent Application No. PCT/US07/71200, 6 pages.
Australian Office Action mailed on Jul. 1, 2010, for AU Patent Application No. 2007261152, 2 pages.
Australian Notice of Acceptance mailed on Aug. 11, 2011 for AU Patent Application No. 2007261152, 3 pages.
Australian Examination Report mailed on Jun. 29, 2012 for AU Patent Application No. 2008268326, 3 pages.
International Search Report of the International Searching Authority for Application No. PCT/US2008/068281, mailed Oct. 22, 2008, 1 page.
International Written Opinion of the International Searching Authority for Application No. PCT/US2008/068281, mailed Oct. 22, 2008, 4 pages.
Menezes, A.J., et al., "Handbook of Applied Cryptography," XP-002662759, Oct. 1997, CRC Press, LLC, USA; pp. 192-194, 330-331, 363, 490, 498-499, 551-553 (12 pages total).
Supplementary European Search Report for Application No. EP08781002.4, dated Nov. 15, 2011, 7 pages.
Notice of Allowance mailed Jun. 2, 2014 in U.S. Appl. No. 12/264,036, 10 pages.
Non-Final Office Action mailed Jul. 7, 2014 in U.S. Appl. No. 12/146,150, 19 pages.
Office Action mailed Jul. 14, 2014 in CA Patent Application No. 2,655,465, 2 pages.

\* cited by examiner

| PAN | EXP DATE | SERVICE CODE | PIN VERIFICATION DATA | CVV+ | DISC DATA |

TRACK DATA ENCRYPTION

CROSS-REFERENCES TO RELATED APPLICATIONS

This patent application is a continuation of U.S. patent application Ser. No. 11/761,821, filed Jun. 12, 2007, now U.S. Pat. No. 7,818,264, which claims priority to and is a non-provisional of U.S. Patent Application Nos. 60/815,059, filed on Jun. 19, 2006, 60/815,430 filed on Jun. 20, 2006, and U.S. patent application Ser. No. 60/884,089, filed on Jan. 9, 2007, which are all herein incorporated by reference in their entirety for all purposes.

BACKGROUND

In a typical purchase transaction, a consumer may use a portable consumer device to buy goods or services from a merchant. The consumer's PAN or primary account number may be stored in a memory on the portable consumer device. The PAN may be read at a point of sale terminal operated by a merchant, and the PAN and other information may be transmitted to the issuer of the portable consumer device along with other transaction information such as the amount of the purchase, etc. Once received, the issuer may then decide whether or not the consumer is authorized or not authorized to conduct the purchase transaction.

In conventional purchase transactions, the PAN is not encrypted when it passes from the portable consumer device, to the point of sale terminal, and to the issuer. The non-encryption of the PAN is not a major issue in view of current network security and fraud detection mechanisms. However, it would be desirable to add upfront security to existing payment systems. For example, if the PAN gets intercepted by an unauthorized person during the transmission of the PAN from the point of sale terminal to the issuer, the unauthorized person could use the PAN to make unauthorized purchases. Thus, new ways to provide for secure transmission of the PAN to the issuer or other entity are desirable.

Embodiments of the invention address these and other problems individually and collectively.

BRIEF SUMMARY

Embodiments of the invention are directed to methods, systems, and computer readable media that can be used to securely deliver a PAN associated with a portable consumer device from a portable consumer device, a point of sale terminal, or some other location, to an issuer of the portable consumer device.

The real PAN associated with the consumer and the consumer's portable consumer device may be referred to as a "primary PAN." In embodiments of the invention, the primary PAN can be changed to a secondary PAN, which is linked to the primary PAN. At least a portion of the secondary PAN may be changed (e.g., encrypted) before it arrives at the issuer, and the issuer (or other entity such as a payment processing network) may subsequently determine the consumer's primary PAN from the received secondary PAN. The secondary PAN may or may not be known to the consumer.

Advantageously, the secondary PAN can be used to securely transmit primary PAN information to the issuer. Also, the secondary PAN may be used to authenticate the portable consumer device being used in a particular transaction. If, for example, the secondary PAN that is received by the issuer is not the correct secondary PAN (e.g., the issuer expects to receive the secondary PAN, and not the primary PAN, in Track 1 or Track 2), then the issuer may conclude that the portable consumer device being used is not authentic and may thereafter not approve the payment transaction.

One embodiment of the invention is directed to a method comprising providing a secondary PAN associated with a primary PAN, wherein the secondary PAN has end portions, and at least one end portion (e.g., a BIN or bank identification number end portion) is the same as the primary PAN. The secondary PAN may also have a middle portion that is different than the primary PAN. Approval or disapproval for a payment transaction is received after providing the secondary PAN. This method may be performed by any suitable entity including the consumer or the merchant, with or without other entities.

Another embodiment of the invention is directed to a portable consumer device comprising a body, and a computer readable medium coupled to the body. The computer readable medium comprises code for a secondary PAN associated with a primary PAN. The secondary PAN has end portions, and at least one of the end portions is the same as the primary PAN. A middle portion of secondary PAN is different than the primary PAN.

Another embodiment of the invention is directed to a computer readable medium. The computer readable medium comprises code for providing a secondary PAN associated with a primary PAN using a portable consumer device. The secondary PAN has end portions, and at least one end portion is the same as the primary PAN. The secondary PAN also has a middle portion that is different than the primary PAN. The computer readable medium also comprises code for receiving approval or disapproval for a payment transaction after providing the secondary PAN.

Another embodiment of the invention is directed to a method comprising receiving an authorization request message associated with a transaction, the authorization request message including a secondary PAN associated with a primary PAN. The secondary PAN has end portions and a middle portion. At least one of the end portions is the same as the primary PAN, and at least a middle portion of the secondary PAN is different than the primary PAN. Once the secondary PAN is received, the secondary PAN is analyzed, and the primary PAN is analyzed after analyzing the secondary PAN. After the primary and secondary PANs are analyzed, an authorization response message is sent. The authorization response message indicates approval or disapproval of the transaction. This method may be performed by one or more entities including an issuer, payment processing network, etc.

Another embodiment of the invention is directed to a computer readable medium. The computer readable medium comprises code for receiving an authorization request message associated with a transaction, where the authorization request message including a secondary PAN associated with a primary PAN. The secondary PAN has end portions, and at least one of the end portions is the same as the primary PAN. A middle portion of the secondary PAN is different than the primary PAN. The computer readable medium also comprises code for analyzing the secondary PAN, code for analyzing the primary PAN, and code for sending an authorization response message, wherein the authorization response message indicates approval or disapproval of the transaction.

Another embodiment of the invention is directed to a method comprising providing a secondary PAN associated with a primary PAN, wherein the secondary PAN has a location identification data element. The location identification data element is the same in both the primary and secondary PANs, and at least the middle portion of the secondary PAN is different than the primary PAN. The method also includes receiving approval or disapproval for a payment transaction after providing the secondary PAN.

These and other embodiments of the invention are described in further detail below, with reference to the Figures.

DETAILED DESCRIPTION

As explained above, a consumer's PAN is not encrypted in conventional purchase transactions. While encryption of the entire PAN can be contemplated to enhance security, encrypting the entire PAN may not be practical under all circumstances. For example, the PAN contains a BIN or a bank identification number. The BIN is used to route the transaction data to the issuer, and the encrypted BIN may not be recognized by the routing and switching infrastructure computers that route transaction data to the issuer. If the entire PAN is encrypted, then the BIN would change and this would cause routing problems. Accordingly, any encryption process that is used to encrypt the PAN would preferably do so without negatively impacting the existing payments infrastructure, and the way that payment transactions are currently handled.

There are a number of other restrictions associated with encrypting PANs. For example, in the context of a payment card with a magnetic stripe, cardholder account data (including the cardholder's PAN) on the magnetic stripe is encoded on "Track 1" and/or "Track 2" of the magnetic stripe. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

Track 1 is 79 characters long and has limited space. Track 2 is a totally numeric field, is 37 characters long, and also has limited space. Because of these restrictions, the data that are in Track 1 or Track 2 are in decimal form. The data cannot be in any other form such as hexadecimal (except for the cardholder name in track 1). This limits the ability to encrypt the PAN in Tracks 1 or 2.

Figure 1:
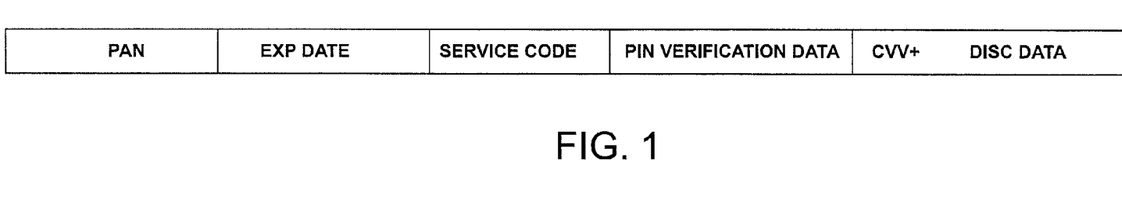
FIG. 1 shows a schematic illustration of data elements in a data track associated with a portable consumer device.

FIG. 1 shows a generic schematic diagram representing a generic data track associated with a portable consumer device. The illustrated data track contains various data fields.

As shown in FIG. 1, the data fields may contain a PAN field, an expiration date field, a service code field, a PIN, a CVV (personal identification number card verification value) field, and discretionary data fields. Typical PANs may be between about 13-19 digits (e.g., 13, 16, or 19 digits) long, and the PAN data field may be configured to store data of a corresponding size.

Figure 2:
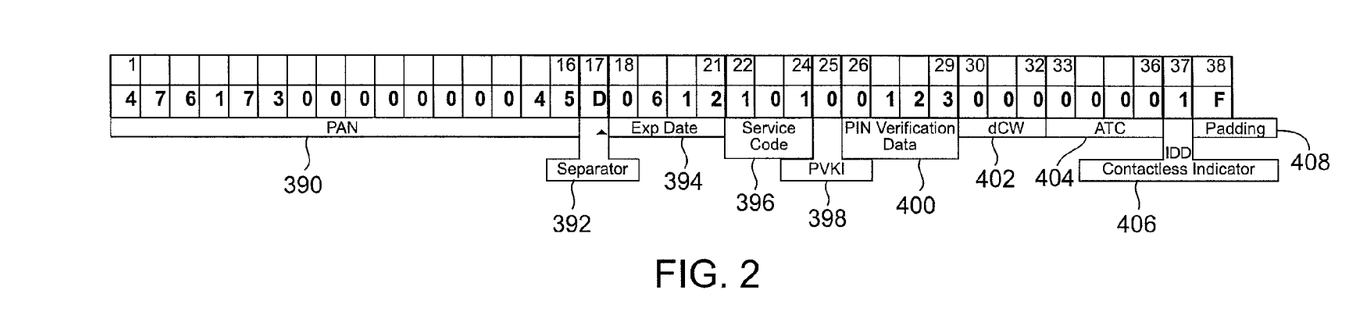
FIG. 2 shows a Track 2 data track as read from an MSD (magnetic stripe data) chip card.

FIG. 2 shows a specific example of a Track 2 format as read from an MSD (magnetic stripe data) chip card. As shown, the exemplary Track 2 format includes a PAN 390, a separator 392, an expiration date 394, a PVKI (pin verification key indicator) 398, pin verification data 400, a dCVV (dynamic card verification value) 402, an ATC (automatic transaction counter 404, a contactless indicator 406 in an issuer discretionary data field or IDD data field, and padding 408.

Figure 3:
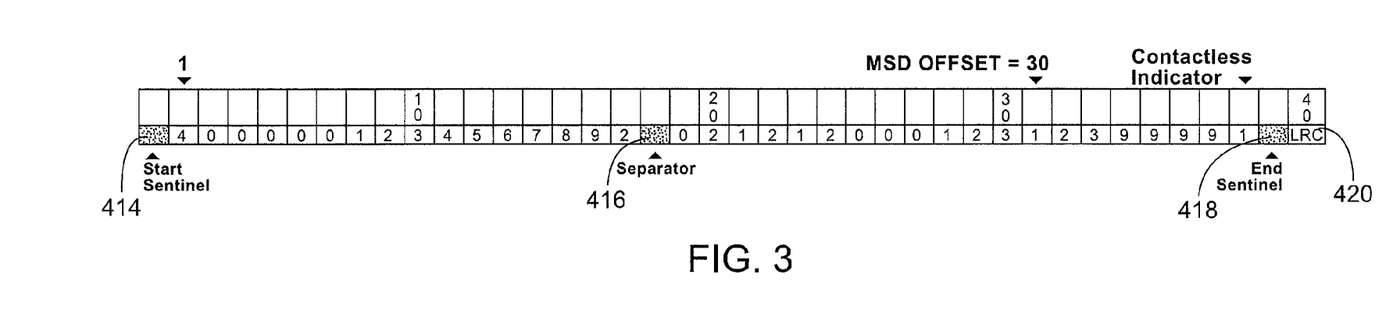
FIG. 3 shows a Track 2 data track as read from a magnetic stripe card.

FIG. 3 shows an exemplary Track 2 data track as read from a magstripe or magnetic stripe card. In FIG. 3, there is a start sentinel 414, and a separator 416. The BIN is between the start sentinel 414 and the separator 416. There is also an end sentinel 418, and a checksum to the right of the end sentinel 420.

The data tracks in FIGS. 2 and 3 are slightly different. The magstripe Track 2 data track shown in FIG. 3 uses an end sentinel 420, since a magnetic reader head in a point of sale terminal would need to know when to start and stop reading data. By comparison, in the chip card Track 2 data track shown in FIG. 2, an end sentinel is not necessary, since the chip in the chip card would output the appropriate amount of data to the point of sale terminal.

Another restriction on encrypting a PAN is that the length of PANs may vary in different countries. For example, PANs may be 13, 16, or 19 digits long. Any method and system for encrypting PANs would preferably work with PANs of varying length.

Another restriction on encrypting a PAN is that the last digit of the PAN is a check digit. It is used to ensure the data integrity of the PAN as it is read by the point of sale terminal. A check digit is a digit added to a number (either at the end or the beginning) that validates the authenticity of the number. A simple algorithm is applied to the other digits of the number which yields the check digit. By running the algorithm, and comparing the value that is determined by the algorithm with the check digit value at the end of the PAN, one can verify that all of the digits are correctly read and that they make a valid combination. A commonly used, well known check digit algorithm is a called a "mod 10" algorithm.

The encryption processes according to embodiments of the invention can be used despite the above-noted restrictions. Embodiments of the invention protect the consumer's PAN and can be used with existing payment verification mechanisms and systems. As will be illustrated in further detail below, embodiments of the invention can encrypt a PAN without requiring any major or unexpected changes to the existing payments infrastructure. Also, embodiments of the invention can also be used with PANs of varying length.

Embodiments of the invention partially "mask" the primary PAN by creating a secondary PAN that is linked to the primary PAN. In one embodiment of the invention, a portion of a transmitted PAN is masked and/or changed by an access device (e.g., a point of sale terminal), a portable consumer device, or the like, before it is received by the issuer during a transaction such as a payment transaction. The portion that is changed (e.g., encrypted) is preferably the middle portion of the PAN. The middle portion may be of any suitable length, but is preferably between 3 and 9 digits long.

Any suitable encryption process may be used to mask the middle portion of the PAN. For example, embodiments of the invention may use DES (dynamic encryption standard), ECC (elliptical curve cryptography), or AEC (advanced encryption cryptography) processes. Any symmetric or asymmetric cryptographic elements may be used.

There are two end portions (e.g., each 4-6 digits long) on opposite sides of the middle portion of the PAN, and at least one of the end portions remains static during the transaction process. For example, at least one end portion of the PAN, which includes the BIN or bank identification number, remains static during the transaction process and at least the middle portion is changed or encrypted. The BIN (or other location identification data element) remains static during the transaction process so that the PAN and other transaction data can be routed to the issuer. The BIN typically occupies the first six digits of the PAN and may be considered a first end portion of the PAN. In other embodiments, instead of a BIN, the merchant location identifier, financial institution location identifier, or even an IP address could be in an end portion of the PAN and may remain static. Any of these may remain static in the PAN instead of the BIN.

In addition to the first end portion of the PAN including the BIN, the other end portion of the PAN also preferably remains static during the transaction process. The second end portion of the primary PAN that remains static preferably includes the last four digits of the primary PAN. That is, the last four digits of the primary and secondary PANs are the same.

There are a number of advantages associated with keeping the second end portion of the secondary PAN the same as the primary PAN. As noted above, the last character of the primary PAN is a check digit or a mod 10 calculation to ensure data integrity. It is therefore desirable that at least this last check digit not be changed so that the point of sale terminal still performs the appropriate check sum verification process. Lastly, the consumer is used to seeing the last four digits of the PAN printed on the consumer's purchase receipts, so it would be desirable not to change the last four digits of the PAN. In addition, the last four digits of the PAN are typically printed on purchase receipts which are often discarded by consumers, so the last four digits are easily discovered. There is therefore little benefit in encrypting the last four digits of the primary PAN. Thus, in preferred embodiments of the invention, the dynamically changing numbers of the PAN are typically masked. The last four digits are static on a payment card receipt that is received by a consumer so that the consumer advantageously does not see anything unusual.

Figure 4:
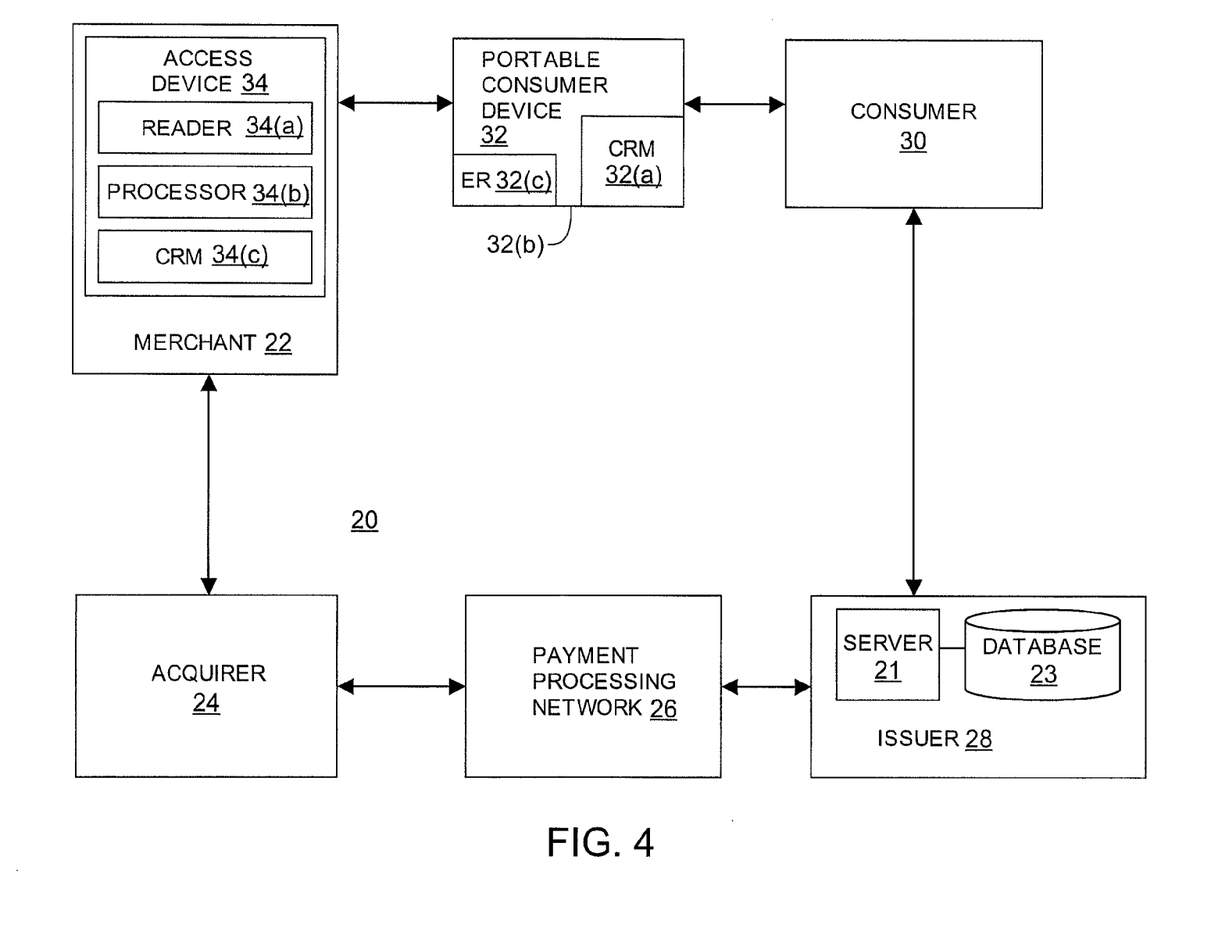
FIG. 4 shows a system according to an embodiment of the invention.

FIG. 4 shows a system 20 that can be used in an embodiment of the invention. The system 20 includes a merchant 22 and an acquirer 24 associated with the merchant 22. In a typical payment transaction, a consumer 30 may purchase goods or services at the merchant 22 using a portable consumer device 32. The acquirer 24 can communicate with an issuer 28 via a payment processing network 26.

The acquirer 24 is typically a bank that has a merchant account. The issuer 28 may also be a bank, but could also be business entity such as a retail store. Some entities are both acquirers and issuers, and embodiments of the invention include such entities.

The consumer 30 may be an individual, or an organization such as a business that is capable of purchasing goods or services.

The portable consumer device 32 may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

The portable consumer device 32 may comprise a computer readable medium 32(a) and a body 32(b). The computer readable medium 32(a) may be on the body 32(b), which may in the form a plastic substrate, housing, or other structure. If the portable consumer device 32 is in the form of a card, it may have an embossed region 32(c) which is embossed with the primary PAN.

The computer readable medium 32(a) may be a memory that stores data and may be in any suitable form. Exemplary computer readable media 32(a) may be in the form of a magnetic stripe, a memory chip, etc. The computer readable medium 32(a) may electronically store the primary and/or the secondary PAN in encrypted or unencrypted form.

The payment processing network 26 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 26 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 26 may use any suitable wired or wireless network, including the Internet.

The merchant 22 may also have, or may receive communications from, an access device 34 that can interact with the portable consumer device 32. In FIG. 4, the access device 34 is located at the merchant 22. However, it could be located at any other suitable location in other embodiments of the invention.

The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

The access device 34 may include a reader 34(a), a processor 34(b) and a computer readable medium 34(c). The reader 34(b) may use any suitable contact or contactless mode of operation. For example, exemplary card readers can include RF (radio frequency) antennas, magnetic stripe readers, etc. to interact with the portable consumer device 32.

In a typical purchase transaction, the consumer 30 purchases a good or service at the merchant 22 using a portable consumer device 32 such as a credit card. The consumer's portable consumer device 32 can interact with an access device 34 such as a POS (point of sale) terminal at the merchant 22. For example, the consumer 30 may take a credit card and may swipe it through an appropriate slot in the POS terminal. Alternatively, the POS terminal may be a contactless reader, and the portable consumer device 32 may be a contactless device such as a contactless card.

An authorization request message is then forwarded to the acquirer 24. After receiving the authorization request message, the authorization request message is then sent to the payment processing network 26. The payment processing network 26 then forwards the authorization request message to the issuer 28, or a third party entity acting on behalf of the issuer, of the portable consumer device 32.

After the issuer 28, or a third party entity acting on behalf of the issuer, receives the authorization request message, the issuer 28, or the third party entity acting on behalf of the issuer, sends an authorization response message back to the payment processing network 26 to indicate whether or not the current transaction is authorized (or not authorized). The payment transaction processing network 26 then forwards the authorization response message back to the acquirer 24. The acquirer 24 then sends the response message back to the merchant 22.

After the merchant 22 receives the authorization response message, the access device 34 at the merchant 22 may then provide the authorization response message for the consumer 30. The response message may be displayed by the access device 34, or may be printed out on a receipt.

At the end of the day, a normal clearing and settlement process can be conducted by the payment processing network 26. A clearing process is a process of exchanging financial details between and acquirer and an issuer to facilitate posting to a consumer's account and reconciliation of the consumer's settlement position.

Embodiments of the invention can utilize secondary PANs in the above-described payment transaction processes. Such embodiments are described below with reference to FIGS. 4-8.

An encryption method according to one embodiment of the invention may be described with reference to FIGS. 4, 5 and 6(a)-6(b).

In an exemplary embodiment, a consumer 30 uses his portable consumer device 32 to pay for goods or services offered by the merchant 22. The consumer 30 takes the portable consumer device 32 and uses it to interact with the reader 34(a) in the access device 34 as described above. The primary PAN may be stored in the computer readable medium 32(a).

Figure 5:
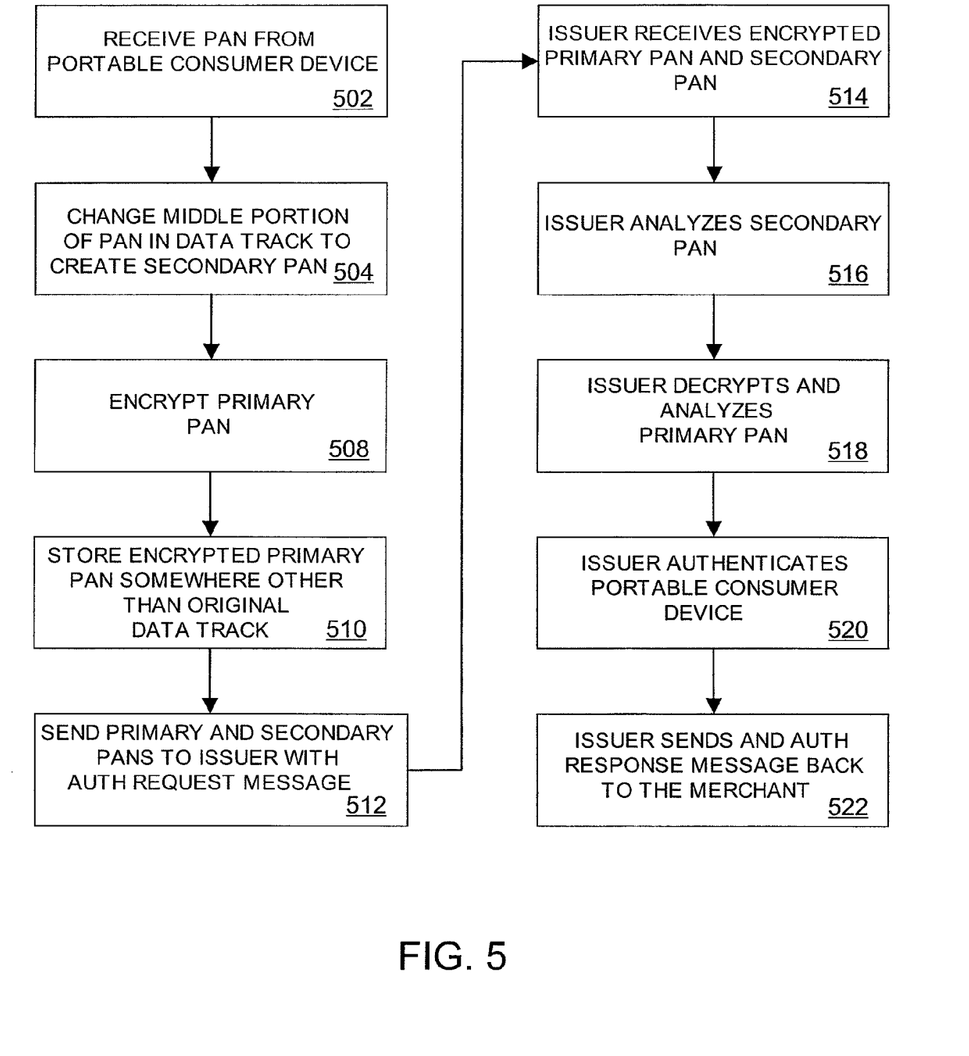
FIG. 5 shows a flowchart illustrating a method according to an embodiment of the invention.

The access device 34 can then receive the primary PAN from the portable consumer device 32 (step 502). The primary PAN may be received from the portable consumer device 32 using any suitable contact or contactless mode of operation.

Figure 6A:
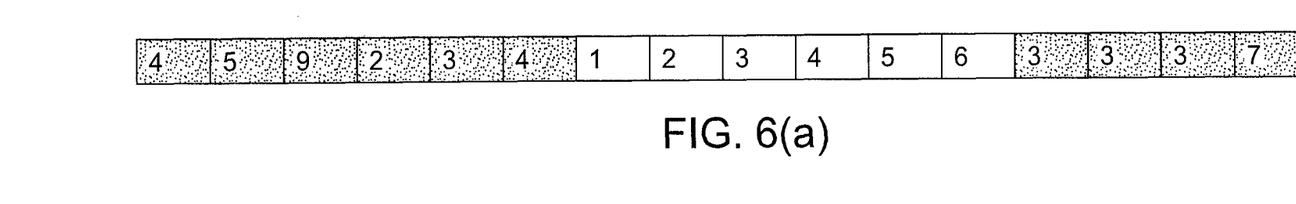
FIGS. 6(a)-6(b) show primary and secondary PANs that can be used in the method shown in FIG. 5.

Once the processor 34(b) in the access device 34 receives the primary PAN, it can take the primary PAN and can change the middle portion of the PAN, while at least one end portion remains static to produce a secondary PAN (step 504). Preferably, both end portions including the BIN and the last four digits of the PAN are the same in both the primary and secondary PANs. For example, FIG. 6(a) shows an exemplary primary PAN which is "4592341234563337." The first six digits "459234" represent the BIN, may be a first end portion, and are static (i.e., the first six digits are the same in both the primary and secondary PANs) during the transaction process. The last four digits "3337" may constitute a second end portion and may also remain static (i.e., the last four digits are the same in both the primary and secondary PANs) during the transaction process. In this example, the first end portion of the secondary PAN (or the primary PAN) includes six digits while the second end portion includes four digits. In other embodiments, the first and second end portions, and the middle portion, may include more or less digits.

Figure 6B:
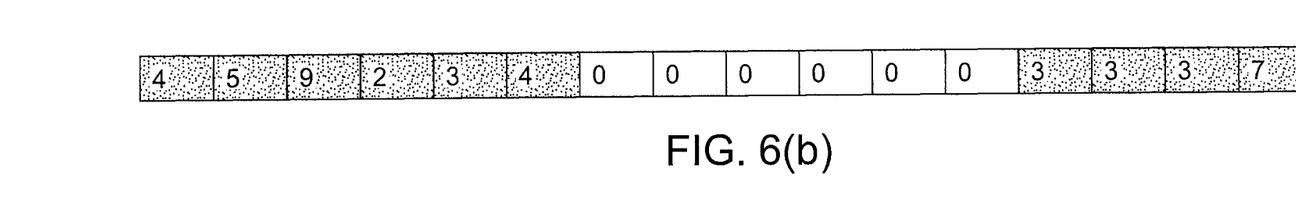

While the first and second end portions remain static, at least a majority of the digits in the middle portion are changed. Preferably, at least 3, 4, or 5 digits in the middle portion, all of the digits in the middle portion, or all of the digits except for one digit in the middle portion, are changed so that they are all the same. For example, as shown in FIG. 6(b), the middle six digits are "zeroed" out in a secondary PAN. By doing this, the issuer can be assured that the formed secondary PAN is not the same as a primary PAN that is associated with another consumer. After the issuer receives the secondary PAN, the issuer would recognize that there is no account number with six zeros in the middle, and the issuer would then locate the primary PAN at another location (as described in further detail below).

In some embodiments, all digits in the middle portion of the secondary PAN are the same, except for one digit. The one digit that is not the same as the other digits may be adjusted so that when a checksum calculation is performed on the secondary PAN, it will match the checksum digit in the primary PAN (i.e., the last digit of the PAN). For example, a checksum calculation may result in "7" for a primary PAN and the number "7" may be at the end of the primary PAN. If all digits in the middle portion of the primary PAN are changed to "0" to form a secondary PAN, this may result in a different checksum value. For example, after replacing the middle portion of the primary PAN with zeros, the checksum value may be different than "7". However, to "trick" the access device 22 into thinking that the correct PAN has been received, one digit in the middle portion of the PAN may be changed to a number other than zero so that the result of the checksum calculation is the proper one. For example, referring to FIG. 6(b), the middle portion of the secondary PAN may be changed to "000900." The addition of the number "9" to the middle portion may cause a checksum calculation to produce the same result (e.g., "7") as the checksum digit associated with an unaltered primary PAN (e.g., "7").

After the secondary PAN is created, the processor 34(b) then stores the secondary PAN in a location where the primary PAN is normally located (e.g., Track 2). The processor 34(b) may then encrypt the entire primary PAN or just a portion of the primary PAN (step 508). The encrypted primary PAN may then be stored in an area other than the data track from which it came (step 510), or in a location other than where it is normally stored. For example, if the primary PAN was originally stored in Track 2, then the encrypted primary PAN may be stored in Track 3 or some other area. The processor 34(b) may perform these and other functions and code for causing the processor 34(b) to perform these functions may be stored in the computer readable medium 34(c).

The access device 34 may then send both the encrypted primary PAN and the secondary PAN (with or within an authorization request message) to the issuer 28 via the acquirer 24 and the payment processing network 26 (step 512). The issuer 28 may then receive both the encrypted primary PAN and secondary PAN (step 514).

A server computer 21 at the issuer 28 then analyzes the secondary PAN (step 516), and then checks to see if it matches the account numbers of any of its customers. Because the middle portion of the secondary PAN has a majority of its digits repeated, or because a valid PAN structure is not present, the server computer 21 at the issuer 28 will recognize that the secondary PAN does not match of its existing account numbers. Consequently, the server computer 21 can then look to the area where the encrypted primary PAN is stored. The server computer 28 then locates the encrypted primary PAN and then decrypts the primary PAN 518 using a key that is stored in the database 23. Once the primary PAN 518 is decrypted, it is analyzed and the portable consumer device 32 is thereafter authenticated. After authenticating the portable consumer device 32, the issuer 28 sends the authorization response message back to the merchant 22 indicating whether or not the consumer 30 is authorized to conduct the transaction.

Although one issuer 28 is shown in FIG. 1, in embodiments of the invention, there may be many issuers. Each issuer can determine the area where the primary PAN is to be stored, if it wants to encrypt the primary PAN in that stored area, and/or the key that is used to encrypt the primary PAN. If different issuers use different protocols for storing and processing the primary PAN, then the risk of widespread fraudulent activity is reduced. For example, if the data that is being transmitted from the merchant 22 to the issuer 28 is intercepted by an unauthorized person, and if the unauthorized person is even capable of determining where the encrypted primary PAN is stored and how to decrypt the transmitted data, the unauthorized person would not be able to use this information to intercept and decrypt PAN information passing to other issuers, since the other issuers would be using a different data protection protocol than the issuer 28.

In the above described example, the secondary PAN is created at the access device 34. Thus, data transmission is very secure between the access device 34 and the issuer 28. However, the secondary PAN could also be generated at any other suitable location. For example, to provide even more security, the portable consumer device 32 could provide both the primary and second PANs to the access device 34 so that the access device 34 does not perform any data conversions or encryption of the primary PAN. The secondary PAN may be stored statically on the computer readable medium 32(a) of the portable consumer device 32, or may be dynamically generated by the portable consumer device 32 if the portable consumer device 30 is a smart card or the like. In such embodiments, the secure transmission of the primary PAN can be provided from the portable consumer device 32 to the issuer 28 to authenticate the portable consumer device 32.

Other embodiments of the invention can be described with reference to FIGS. 4, 7 and 8.

Figure 7:
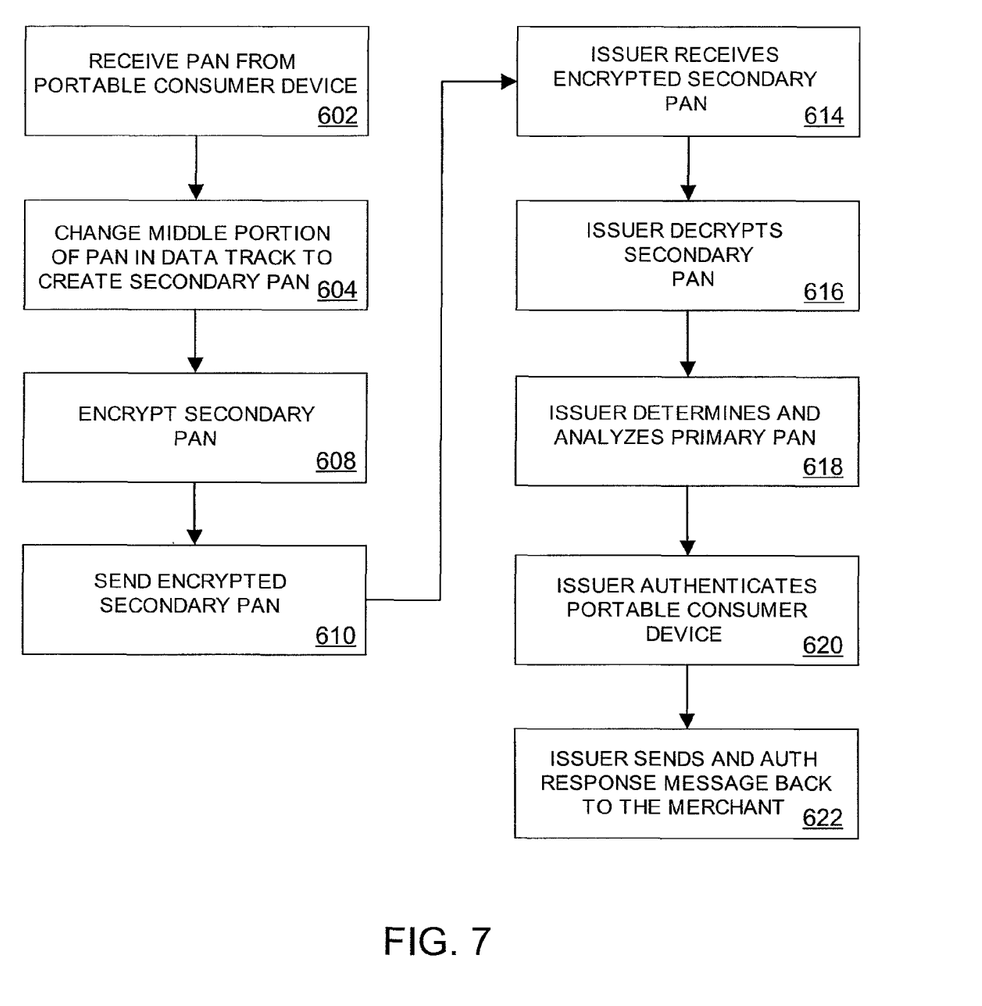
FIG. 7 shows a flowchart illustrating another method according to an embodiment of the invention.
Figure 8:
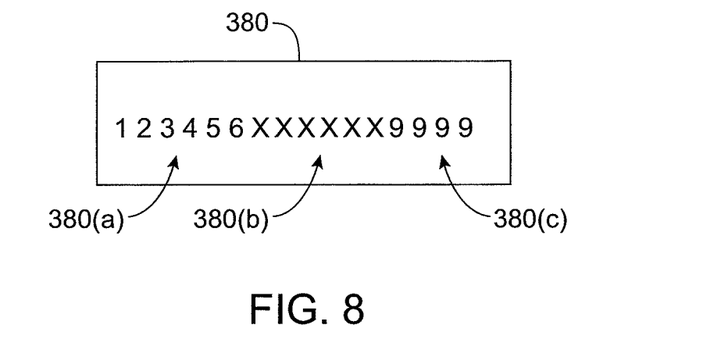
FIG. 8 shows a schematic illustration of a secondary PAN.

FIG. 7 shows a flowchart illustrating an embodiment of the invention. As in the previously described embodiments, in this embodiment, a consumer 30 uses his portable consumer device 32 to pay for goods or services offered by the merchant 22. The consumer 30 takes the portable consumer device 32 and uses it to interact with the reader 34(a) in the access device 34. The primary PAN may be stored in the computer readable medium 32(b).

The access device 34 then receives the primary PAN from the portable consumer device 32 (step 602). The primary PAN may be received from the portable consumer device 32 using any suitable contact or contactless mode of operation.

Once the processor 34(b) in the access device 34 receives the primary PAN, it can take the primary PAN and can change the middle portion of the PAN, while at least one end portion remains static, to produce a secondary PAN (step 604). For example, FIG. 8 shows a schematic illustration of a 16 digit PAN 380 that might reside in the computer readable medium 32(a) (e.g., a magnetic stripe) in the portable consumer device 32. In this example, the first six digits (i.e., a first end portion) "123456" 380(a) of the PAN 380 would correspond to the BIN number. The next 6 digits 380(b) may be changed or different from the real PAN's 6 digits and are represented by "XXXXXX" in this example. In a preferred embodiment, the middle six digits may be dynamically changed using a counter or the like. This makes it more difficult for any unauthorized person to determine the primary PAN.

The last four digits 380(c) (i.e., a second end portion) are "9999" in this example, and would remain the same. By keeping the BIN and the last four digits the same, the transaction will look like a real one to the merchant and the consumer.

In this embodiment, the middle portion does not intentionally contain repeating numerical values, so the issuer 28 may take steps to ensure that the secondary PAN does not match or overlap with the primary PANs of other customers. For example, the issuer may set aside a set of numbers specifically reserved for secondary PANs, and not primary PANs.

The access device 34 then optionally encrypts the secondary PAN (step 608) and sends the encrypted secondary PAN to the issuer 28 via the acquirer 24 and the payment processing network 26 (step 610). The issuer 28 then receives the encrypted secondary PAN (step 614), decrypts it (step 616), determines the primary PAN, and then analyzes it (step 618). An appropriate algorithm or look-up table (e.g., stored in the database 23) at the issuer 28 may be used to link the primary and secondary PANs. After the issuer 28 determines the primary PAN, the issuer 28 may then authenticate the portable consumer device 32 (step 620). The issuer 28 thereafter sends an authorization response message back to the merchant 22 via the payment processing network 26 and the acquirer 24 indicating whether or not the transaction is authorized or approved (step 622).

In many of the specific embodiments described above, a secondary PAN and/or primary PAN is encrypted by an access device 34, a portable consumer device 32, or the like. The encrypted secondary PAN and/or primary PAN is received at the issuer 28 and the issuer 28 may then decrypt the secondary PAN and/or the primary PAN to authenticate the portable consumer device 32 and process the payment transaction. It is understood, however, that in other embodiments of the invention, the decryption process may occur at the payment processing network 26, before the PANs arrive at the issuer 28 in a similar manner as described above. For example, after the primary PAN and/or secondary PAN are decrypted by the payment processing network 26, the payment transaction process can proceed as it normally does. That is, the payment processing network 26 can receive the encrypted primary PAN and/or secondary PAN, decrypt them, verify that the portable consumer device 32 is authentic, and then reformat the authorization request message in a normal format so that the decrypted primary PAN is located in an area where it is normally located. After the authorization request message is reformatted, it can be sent to the issuer 28 as it would be sent in a conventional manner. The issuer 28 can then send the payment processing network 26 an authorization response message, and the payment processing network 26 may in turn send it back to the access device 34 via the acquirer 24 and the merchant 22. Such embodiments are advantageous, since security is enhanced compared to conventional payment processes, yet the issuer 28 will see the same transaction information that it normally sees in conventional payment processes.

Also, in many of the embodiments described above, the secondary PAN is generated during the transaction process. This is not necessary in all cases. Instead of generating the secondary PAN at the access device 34, the secondary PAN may be stored in the computer readable medium of the portable consumer device and it may have a middle portion that is different than the middle portion of the primary PAN. In such embodiments, the secondary PAN may not be generated during the particular transaction being conducted, but may have been previously generated and stored on the portable consumer device 32. In some cases, the primary PAN and may be embossed on the portable consumer device 32 if the portable consumer device 32 is in the form of a payment card, and the secondary PAN may be stored in the computer readable medium 32(a) in the portable consumer device 32.

As illustrated above, in some embodiments, both the primary PAN and the secondary PAN may be transmitted to the issuer to verify that the portable consumer device being used is authentic. If an unauthorized person tries to use the primary PAN, then that unauthorized person will not know the secondary PAN and cannot fraudulently conduct a purchase transaction without knowing the secondary PAN. Alternatively, if an unauthorized person electronically intercepts or "skims" the secondary PAN, then the unauthorized person will not be able to conduct the purchase transaction without knowing the primary PAN.

In yet other embodiments, as noted above, the middle portion of the PAN may be changed dynamically. For example, an appropriate algorithm or counter may be used to dynamically change the middle portion of the PAN each time the portable consumer device is used. This way, even if the primary PAN is electronically intercepted by an unauthorized person, and the unauthorized person knows the primary PAN, the secondary PAN will be dynamically changing. Even if the unauthorized person knows the primary PAN and intercepts the secondary PAN once, the intercepted secondary PAN would be useless, since it is a dynamically changing secondary PAN. In this case, the unauthorized person would need to know the algorithm used to dynamically change the PAN in addition to the primary PAN, the secondary PAN and potentially any keys that are required for the encryption or secondary PAN derivation process. Thus, this embodiment is particularly useful for conducting secure transactions.

Embodiments of the invention can have one or more of the following advantages. First, there are no major impacts on the terminal side. Second, routing is preserved and is not impacted. Third, encryption could be card based or terminal based encryption. Fourth, there are no impacts on the receipt printing and the card holder experience. Fifth, there are no impacts on issuer processing as the issuer is receiving the clear unencrypted data (if the primary PAN is decrypted before it reaches the issuer). Sixth, embodiments of the invention take advantage of pre-existing data delivery fields and standard, publicly available and proven encryption methods and algorithms (e.g., the symmetric Triple DES algorithm). Seventh, embodiments of the invention would need only minor system updates on the acquirer side and would use fields that are currently well defined and understood. Eighth, since the data are encrypted, embodiments of the invention can be used against certain counterfeit attacks rendering it difficult to use data obtained at a face to face merchant, mail order, telephone, or Internet based environments. As the data could be encrypted and dynamic, embodiments of the invention can help defend against fraudulent attacks on the merchants' databases as the data is rendered useless.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
receiving, at a computer, an authorization request message associated with a transaction, the authorization request message including a secondary Primary Account Number (PAN) in a PAN data field of the authorization request message, and a primary PAN that is encrypted and located in a location of the authorization request message other than the PAN data field, wherein the secondary PAN is associated with the primary PAN, wherein the secondary PAN has end portions and a middle portion, wherein at least one of the end portions of the secondary PAN is the same as a corresponding end portion of the primary PAN, while at least the middle portion of the secondary PAN is different than a corresponding middle portion of the primary PAN;
determining, by the computer, that the secondary PAN in the PAN data field is not a valid PAN;
identifying, by the computer, based on the determination, the location of the encrypted primary PAN in the authorization request message;
decrypting, by the computer, the encrypted primary PAN;
determining, by the computer, based upon the decrypted primary PAN, an authorization response indicating whether the transaction is to be approved or disapproved; and
sending, by the computer, an authorization response message including the authorization response.

2. The method of claim 1, wherein the primary PAN is associated with a portable consumer device, and wherein the method is performed by an issuer or a payment processing network.

3. The method of claim 1, wherein the middle portion of the secondary PAN comprises at least three digits that each have a same value.

4. The method of claim 1, wherein the end portions of the secondary PAN include a first end portion including a Bank Identification Number (BIN) and a second end portion including four digits.

5. The method of claim 1, wherein the secondary PAN was initially provided for the payment transaction from a portable consumer device.

6. A non-transitory computer readable storage medium comprising instructions that, when executed by one or more processors of a computer, cause the computer to perform operations comprising:

receiving, at the computer, an authorization request message associated with a transaction, the authorization request message including a secondary Primary Account Number in a PAN data field of the authorization request message, and a primary PAN in a location of the authorization request message other than the PAN data field, wherein the secondary PAN is associated with the primary PAN, wherein the secondary PAN has end portions and a middle portion, and wherein at least one of the end portions of the secondary PAN is the same as a corresponding end portion of the primary PAN, while at least the middle portion of the secondary PAN is different than a corresponding middle portion of the primary PAN;

based upon a determination that the secondary PAN in the PAN data field is not a valid PAN, identifying, by the computer, the location of the encrypted primary PAN in the authorization request message;

decrypting the encrypted primary PAN;

determining, based upon the decrypted primary PAN, an authorization response indicating whether the transaction is to be approved or disapproved; and sending, by the computer, an authorization response message including the authorization response.

7. The non-transitory computer readable storage medium of claim 6 wherein the end portions of the secondary PAN include a first end portion including a Bank Identification Number (BIN) and a second end portion including four digits.

8. The non-transitory computer readable storage medium of claim 6 wherein the middle portion of the secondary PAN comprises at least three digits that have a same value.

9. The non-transitory computer readable storage medium of claim 6 wherein the primary PAN and the secondary PAN both have 13, 16, or 19 digits.

10. A server comprising:
one or more processors; and
a non-transitory computer readable storage medium including instructions that when executed by the one or more processors, cause the one or more processors to perform operations comprising:
receiving an authorization request message associated with a transaction, the authorization request message including a secondary Primary Account Number (PAN) in a PAN data field of the authorization request message, and a primary PAN in a location of the authorization request message other than the PAN data field, wherein the secondary PAN is associated with the primary PAN, wherein the secondary PAN has end portions and a middle portion, and wherein at least one of the end portions of the secondary PAN is the same as a corresponding end portion of the primary PAN, while at least the middle portion of the secondary PAN is different than a corresponding middle portion of the primary PAN;

based upon a determination that the secondary PAN in the PAN data field is not a valid PAN, identifying the location of the encrypted primary PAN in the authorization request message;

decrypting the encrypted primary PAN;

determining, based upon the decrypted primary PAN, an authorization response indicating whether the transaction is to be approved or disapproved; and sending an authorization response message including the authorization response.

11. The method of claim 1, wherein the middle portion of the secondary PAN comprises encrypted digits.

12. The method of claim 11, wherein the encrypted digits are dynamically generated.

13. The computer readable medium of claim 6, wherein the middle portion of the secondary PAN comprises encrypted digits.

14. The computer readable medium of claim 13, wherein the encrypted portion is generated dynamically.

15. The computer readable medium of claim 13, wherein the encrypted portion is statically stored on a portable consumer device.

16. The computer readable medium of claim 8, wherein the middle portion of the secondary PAN further comprises a digit selected to allow a checksum operation to be performed using the secondary PAN that will generate a same value as a checksum digit of the decrypted primary PAN, wherein the digit has a different value than the value of the three digits of the middle portion of the secondary PAN.

17. The method of claim 1 wherein said determination that the secondary PAN in the PAN data field is not a valid PAN comprises determining that a number of digits in the middle portion of the secondary PAN all have a same value.

18. The method of claim 1 wherein said determination that the secondary PAN in the PAN data field is not a valid PAN comprises determining that a structure of the secondary PAN does not conform with a list of valid PAN structures.

19. The method of claim 17 wherein said identifying of the location of the encrypted primary PAN in the authorization request message comprises retrieving a predetermined PAN location identifier from a database.

20. The method of claim 19 wherein said decrypting the encrypted primary PAN comprises:
retrieving, a decryption key from the database; and
performing a decryption operation using the encrypted primary PAN and the decryption key.

* * * * *